United States Patent [19]

Evans et al.

[11] Patent Number: 5,410,408
[45] Date of Patent: Apr. 25, 1995

[54] OPTICAL ARRANGEMENT FOR PERFORMING NULL TESTING OF ASPHERIC SURFACES INCLUDING REFLECTIVE/DIFFRACTIVE OPTICS

[75] Inventors: Clinton Evans, Midland; Melvin Francis, Port McNicoll, both of Canada

[73] Assignee: Hughes Aircraft Company, Los Angeles, Calif.

[21] Appl. No.: 172,459

[22] Filed: Dec. 22, 1993

[51] Int. Cl.$^6$ .................................... G01B 9/02
[52] U.S. Cl. ........................... 356/359; 356/354
[58] Field of Search ................. 356/354, 359, 360; 359/566, 572, 574

[56] References Cited

U.S. PATENT DOCUMENTS

| | | | |
|---|---|---|---|
| 4,115,747 | 9/1978 | Sato et al. | 359/245 |
| 4,239,392 | 12/1980 | Pohle | 359/572 |
| 5,155,553 | 10/1992 | Chen | 356/354 |
| 5,155,554 | 10/1992 | Schnable et al. | 356/360 |

Primary Examiner—Samuel A. Turner
Attorney, Agent, or Firm—Michael W. Sales; Wanda K. Denson-Low

[57] ABSTRACT

An improved null optical testing arrangement (22) for null testing aspheric surfaces of optics includes a reflective/diffractive null optical component (24). The reflective/diffractive null optical component (24) provides a reflective/diffractive surface (30) that is easily qualified as a null testing optical arrangement. The reflective/diffractive surface (30) of the null optic (24) generates a reference wavefront which can be completely characterized by measuring the diameters of diffractive rings with an interferometer (42).

7 Claims, 3 Drawing Sheets

OPTICAL ARRANGEMENT FOR PERFORMING NULL TESTING OF ASPHERIC SURFACES INCLUDING REFLECTIVE/DIFFRACTIVE OPTICS

BACKGROUND OF THE INVENTION

1. Field of the Invention

The present invention generally relates to an improved optical arrangement for performing traceable null testing of aspheric surfaces and, in particular, relates to one such arrangement using reflective/diffractive optics.

2. Description of the Prior Art

Prior art arrangements of null testing optical components have included the use of refractive null lenses. The use of such lenses in a null testing optical arrangement results in a null testing system which is difficult to qualify because accurate knowledge of all of the lens construction parameters, such as radius of curvature, thickness, centering, surface form, material refractive index and homogeneity, is needed. The use of refracting null lenses in null testing optical arrangements also requires that the refractive lens be made from a good specimen of optical glass having well known optical properties.

The use of a diamond turned (kinoform) reflective/diffractive null optical component in the arrangement of the present invention overcomes the above identified problems associated with the qualification of the refractive lens null optical component used in prior art null testing optical arrangements. Also, the improved null testing optical arrangement of the present invention avoids the use of optical materials in the transmission of light and allows the diffractive null testing technique to be immune to homogeneity variations.

Consequently, it is highly desirable to provide an improved null test optical arrangement that overcomes the above recited drawbacks of the prior art null testing optical arrangements using conventional null testing components.

SUMMARY OF THE INVENTION

The present invention contemplates an improved null testing optical arrangement for measuring aspheric surfaces. The improved null testing optical arrangement includes a reflective/diffractive (kinoform) optic having a first surface, a second surface that is both reflective and diffractive, and an aperture between the first and second surfaces. The improved null testing optical arrangement also includes a light transmitting/receiving means positioned adjacent to the first side of the reflective/diffractive (kinoform) optic and proximal to the aperture. The improved null testing optical arrangement further includes an interferometer positioned proximal to the light transmitting/receiving means so as to transmit light to the light transmitting/receiving means. The interferometer initiates a test light wavefront and analyzes a return light wavefront received by the light transmitting/receiving means from the reflective/diffractive (kinoform) optic and aspheric optic work piece.

The present invention also contemplates a method for null testing an optical work piece having an aspheric surface thereon with the improved reflective/diffractive null testing optical arrangement. The method comprises positioning the reflective/diffractive optic a predetermined distance from the aspheric surface of the optical work piece, wherein the second surface of the reflective/diffractive optic is oriented so as to face the aspheric surface of the optical work piece. Light is transmitted from the interferometer towards the light transmitting/receiving means. The light received by the transmitting/receiving means is passed through the aperture towards the aspheric optical work piece to cause the light to be reflected by the aspheric surface of the aspheric optical work piece onto the second surface of the reflective/diffractive (kinoform) optic. The light is further reflected by the second surface of the reflective/diffractive (kinoform) optic onto the aspheric surface of the optical work piece. The light is finally reflected by the aspheric surface of the optical work piece through the aperture and onto the light transmission/receiving means. The light is finally transmitted by the light transmission/receiving means to the interferometer where the interference pattern of the multiple reflected light is analyzed.

Accordingly it is one object of the present invention to provide an improved null testing optical arrangement for performing traceable null testing of aspheric surfaces.

Another object of the present invention is to provide a method for traceable null testing of an aspheric surface.

These objects are accomplished, at least in part, by an improved optical arrangement for performing traceable null testing of aspheric surfaces using reflective/diffractive optics.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include.

DETAILED DESCRIPTION OF THE INVENTION

Figure 1:
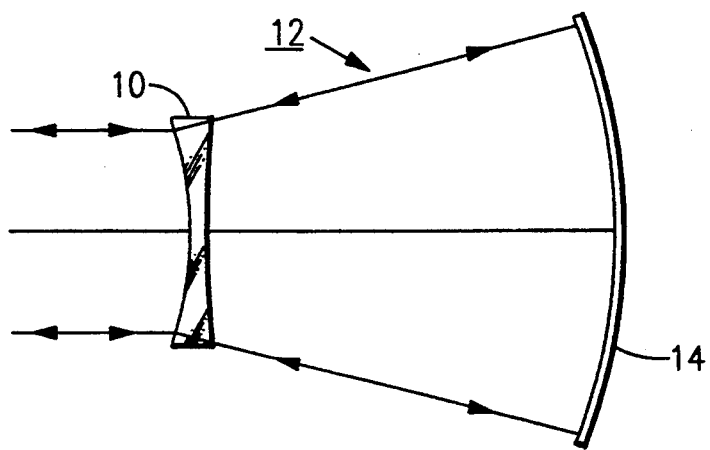
FIG. 1 is a schematic diagram illustrating the use of a refractive lens null optical component in a prior art null testing optical arrangement to test a concave mirror.
Figure 2:
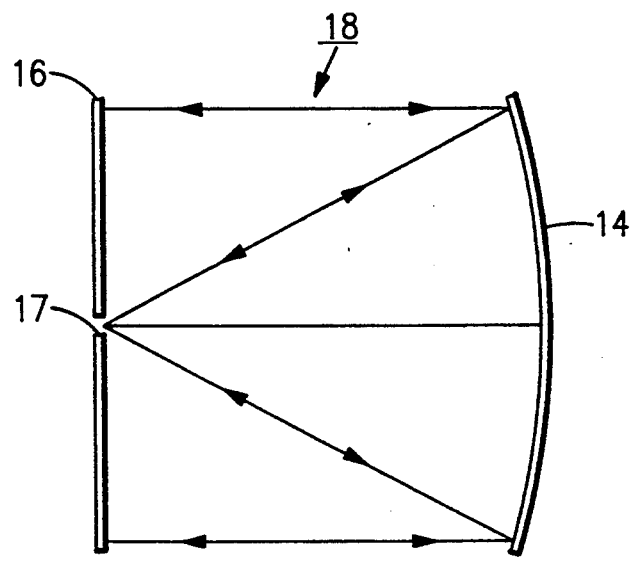
FIG. 2 is a schematic diagram illustrating the use of a plane aluminum reflective surface null optical component in a prior art null testing optical arrangement to test the same concave mirror.
Figure 3:
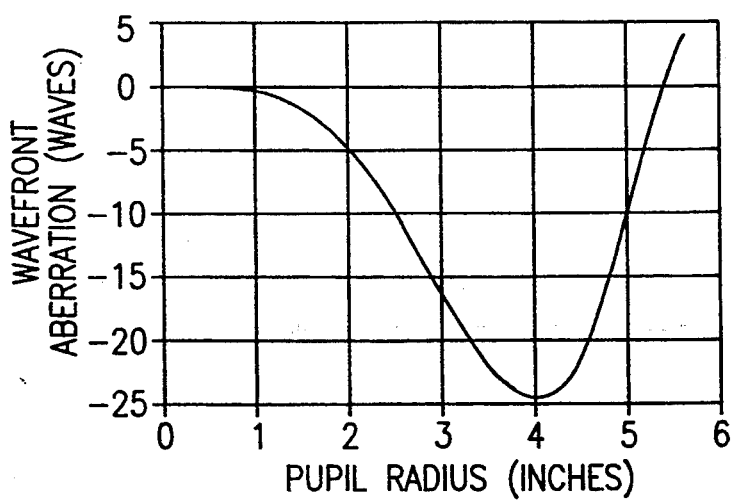
FIG. 3 is a graph of a typical wavefront error for the concave mirror as tested by the prior art null testing arrangements illustrated in FIGS. 1 and 2.

FIG. 1 illustrates the use of a refractive lens 10 null optic in a prior art null testing optical arrangement 12 for testing the surface of concave mirror 14. FIG. 2 illustrates the use of a plane reflective mirror 16 null optic having an aperture 17 in another prior art null testing optical arrangement 18 for testing the surface of concave mirror 14. With the prior art null testing optical arrangements shown in FIGS. 1 and 2, null testing is typically performed by constructing the optical system to be tested within the system's design tolerances followed by testing the system with a commercial interferometer. A typical wavefront aberration for concave mirror 14 for light at a wave length of 633 nm is shown graphically in terms of wavefront aberration (waves) versus pupil radius (inches) in FIG. 3.

Figure 6:
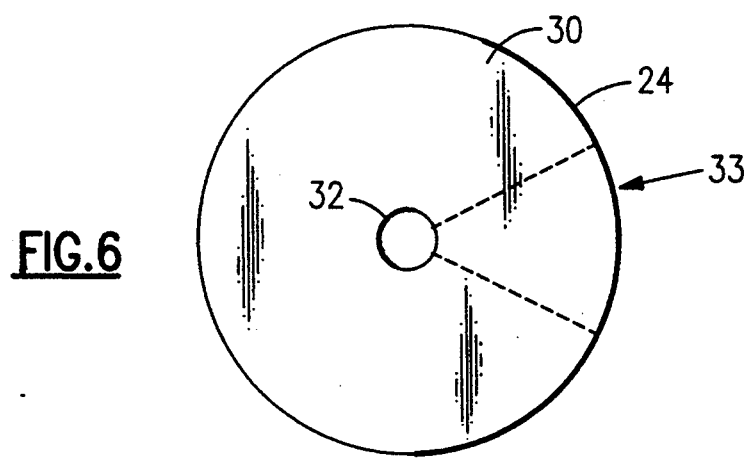
FIG. 6 is a view of the reflective/diffractive second side of the reflective/diffractive null optic.
Figure 7:
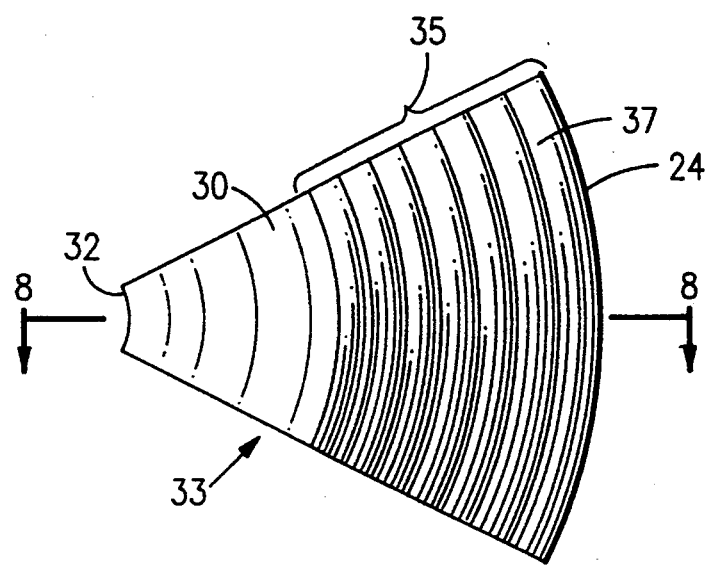
FIG. 7 is a view of a section (not to scale) of the reflective/diffractive null optic illustrating the diffraction grating turned therein.
Figure 8:
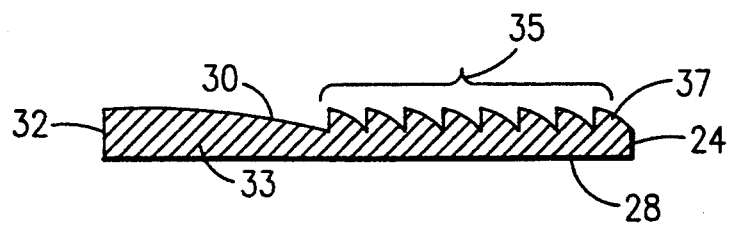
FIG. 8 is a sectional view of FIG. 7, illustrating a typical profile for the diffraction grating.

Referring to FIGS. 4, 6, 7 and 8, the arrangement 22 of the present invention includes a reflective/diffractive null optic 24 having a first surface 28, a reflective/diffractive disposed on a second surface 30 thereof, and an aperture 32 therebetween where light from a light source can pass through. FIGS. 6, 7 and 8 illustrate a portion 33 of a diffraction pattern 35 of the reflective/diffractive surface 30 that comprises a series of concentric facet surfaces 37. In a preferred embodiment, the null optic 24 is made from aluminum and the concentric facet surfaces 37 are formed by well known diamond cutting apparatus and techniques. As will be appreciated by those skilled in the art, other reflective materials may be used without departing from the scope of the present invention.

In another preferred embodiment, the aperture 32 is substantially central in the surfaces, 28 and 30. While the aperture 32 need only be a size convenient to admit light therethrough, the aperture should be kept small because a portion of the test pattern is lost by the aperture. In practice, an aperture 32 approximately 5 mm in diameter has been found to perform satisfactorily.

Figure 4:
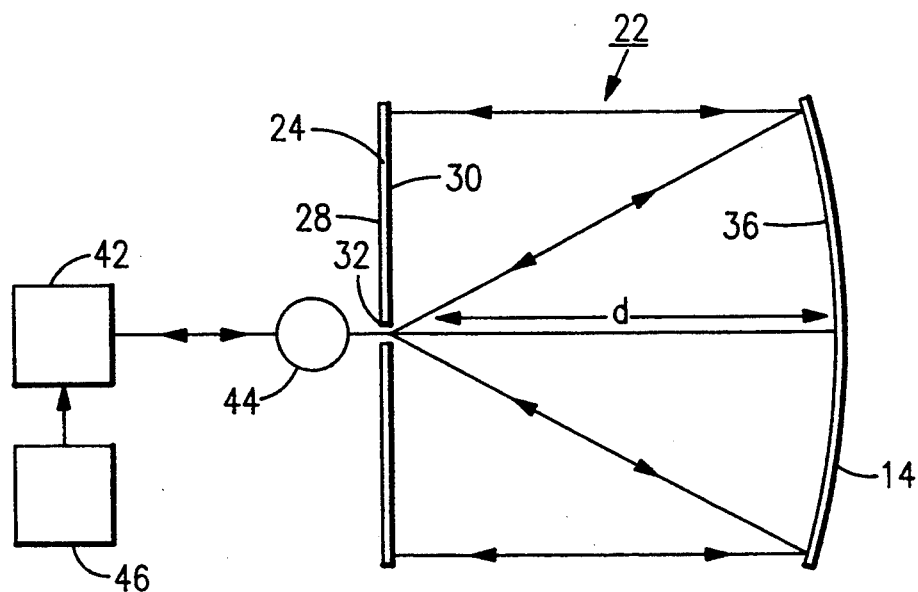
FIG. 4 is a schematic diagram illustrating the use of a diamond turned reflective/diffractive (kinoform) optical component in the null testing optical arrangement embodying the principles of the present invention.

As shown in FIG. 4, the arrangement 22 of the present invention also includes an interferometer 42 and a light transmitter/receiver 44. Any well known commercial interferometer may be used as the interferometer 42 and the light transmitter/receiver 44 may be any well known apparatus for transmitting light such as a highly corrected lens supplied with a commercial interferometer or a light transmission sphere. The arrangement 22 also includes a wavefront analyzer 46. A commercially available computer may be used as the wavefront analyzer 46.

Now referring to FIG. 4, the reflective/diffractive optic 24 is used in the null testing arrangement 22 of the present invention by positioning the optic 24 in front of the concave mirror 14 to be tested so that the second surface 30 having the diamond turned diffraction pattern thereon faces the reflective surface 36 of concave mirror 14. The optic 24 is positioned at its design distance d from the reflective surface 38 of the concave test mirror 14. The design distance d is in the vicinity of the focus of the test mirror. The interferometer 42 and light transmitter/receiver 44 are positioned adjacent to the first surface 28 of the optic 24. A light wavefront from the interferometer 42 is focused through the light transmitter/receiver 44 so that it passes the light wavefront through the aperture 32. The light wavefront passing through the aperture 32 is initially reflected off of the concave test mirror 14 onto the reflective/diffractive surface 30 of the reflective/diffractive optic 24. The wavefront is then reflected by the reflective/diffractive surface 30 back onto the concave mirror 14 where a second reflection causes the light wavefront to pass back through aperture 32, through the light transmitter/receiver 44 and through the interferometer 42.

The mirror 14 is characterized by analyzing the wavefront of the light returning through the interferometer 42 with analyzer 46.

The reflection of the wavefront from the reflective/diffractive surface 30 of optic 24 generates a reference wavefront that can be completely characterized by measuring the diameters of diffractive rings on the second surface of the optic 24. This reference wavefront allows the reflective surface 36 of mirror 14 to be analyzed because the diffraction pattern on the reflective/diffractive surface 30 of optic 24 cancels the aspheric components of the wavefront thus allowing analysis by the interferometer 42.

Figure 5:
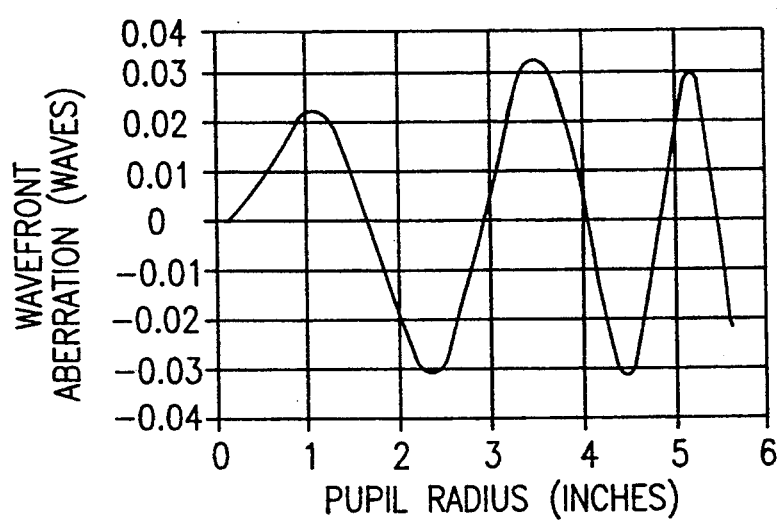
FIG. 5 is a graph of residual wavefront error achieved with the reflective/diffractive null testing optical arrangement of FIG. 4.

FIG. 5 graphically illustrates a residual wavefront aberration in terms of wavefront aberration (waves) versus pupil radius (inches) of the aperture 32 of optic 24 typically measured with the null testing optical arrangement 22 of the present invention with light at a wavelength of 633 nm.

Thus, with the present invention now fully described, it can be seen that the objectives set forth above are efficiently attained and since certain changes may be made in the above-described device without departing from the spirit and scope of the invention, it is intended that all matter contained in the above description or shown in the accompanying drawings shall be interpreted as illustrative and not in a limiting sense. Hence the present invention is deemed limited only by the appended claims and the reasonable interpretation thereof.

What is claimed is:

1. An improved null testing optical arrangement for measuring an aspheric surface of an optical work piece, the arrangement comprising:
   a reflective/diffractive (kinoform) optic having a first surface, a second surface and an aperture therebetween, wherein the second surface is reflective and includes a diffraction pattern therein said diffraction pattern including a series of concentric facet surfaces;
   means for transmitting/receiving light, the means being positioned adjacent to the first surface of the reflective/diffractive (kinoform) optic proximal to the aperture to transmit and receive light through the aperture; and
   an interferometer, the interferometer being positioned adjacent to the light transmitting/receiving means to transmit light to the light transmitting/receiving means and to receive light from the light transmitting/receiving means.

2. The improved null testing optical arrangement as described in claim 1, wherein the first and second surfaces are opposing each other.

3. The improved null testing optical arrangement as described in claim 1, wherein the optic is aluminum.

4. The improved null testing optical arrangement as described in claim 1, wherein the light transmitting means is a highly corrected lens.

5. The improved null testing optical arrangement as described in claim 1, wherein the light transmitting means is a transmission sphere.

6. The improved null testing optical arrangement as described in claim 1, wherein the aperture is substantially central in the first and second surfaces.

7. A method for null testing an optical work piece having an aspheric surface thereon with an improved reflective/diffractive null testing optical arrangement, the method comprising:

positioning a reflective/diffractive optic having a first surface, a reflective/diffractive second surface, the second surface being reflective and including a diffraction pattern therein, said diffraction pattern including a series of concentric facet surfaces, a predetermined distance from the aspheric surface of the optical work piece, wherein the second surface of the reflective/diffractive optic is oriented to face the aspheric surface of the optical work piece;

transmitting light from an interferometer towards a means for transmitting/receiving light such that light from the light transmitting/receiving means passes through the aperture towards the aspheric optical work piece such that;

the light is first reflected by the aspheric surface of the aspheric optical work piece onto the second surface of the reflective/diffractive (kinoform) optic, the light is then reflected by the second surface of the reflective/diffractive optic back onto the aspheric surface of the optical work piece, and the light is finally reflected by the aspheric surface of the optical work piece through the aperture and onto the light transmitting/receiving means;

transmitting the light received by the light transmitting/receiving means from the aspheric optical work piece to the interferometer; and analyzing the interference pattern of light received by the interferometer from the light transmitting/receiving means with an analyzer.

* * * * *